(12) United States Patent
Zee et al.

(10) Patent No.: US 10,306,692 B2
(45) Date of Patent: May 28, 2019

(54) MULTI-PATH TRANSMISSION CONTROL PROTOCOL

(71) Applicant: Telefonaktiebolaget LM Ericsson (publ), Stockholm (SE)

(72) Inventors: Oscar Zee, Stockholm (SE); Michael Eriksson, Sollentuna (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/324,455

(22) PCT Filed: Jul. 7, 2014

(86) PCT No.: PCT/SE2014/050866
§ 371 (c)(1),
(2) Date: Jan. 6, 2017

(87) PCT Pub. No.: WO2016/007051
PCT Pub. Date: Jan. 14, 2016

(65) Prior Publication Data
US 2017/0188407 A1 Jun. 29, 2017

(51) Int. Cl.
*H04W 76/16* (2018.01)
*H04L 29/06* (2006.01)
*H04W 36/00* (2009.01)
*H04W 72/08* (2009.01)
*H04L 12/46* (2006.01)
*H04W 36/14* (2009.01)

(52) U.S. Cl.
CPC ......... *H04W 76/16* (2018.02); *H04L 12/4625* (2013.01); *H04L 69/14* (2013.01); *H04L 69/163* (2013.01); *H04W 36/0027* (2013.01); *H04W 72/085* (2013.01); *H04W 36/14* (2013.01)

(58) Field of Classification Search
None
See application file for complete search history.

(56) References Cited

U.S. PATENT DOCUMENTS

2002/0081039 A1* 6/2002 Funahashi ........... G06F 17/3028
382/305
2009/0185477 A1* 7/2009 Lee ....................... H04L 1/1825
370/216

(Continued)

OTHER PUBLICATIONS

Deng, L. et al., "Use-cases and Requirements for MPTCP Proxy in ISP Networks", MPTCP Working Group, China Mobile, May 29, 2014, 1-18.

(Continued)

*Primary Examiner* — Eunsook Choi
(74) *Attorney, Agent, or Firm* — Murphy, Bilak & Homiller, PLLC

(57) ABSTRACT

It is disclosed a MPTCP capable system for reducing disconnection time for a MPTCP capable UE (702), when it is leaving a coverage area of a second radio access type, when the second RAT typically has priority over the first RAT. This disclosure further comprises a controller of the second RAT (706), a MPTCP capable network proxy node(708), as well as a MPTCP network system therefore. In addition, methods and computer program in the respective arrangement are also presented.

20 Claims, 9 Drawing Sheets

(56) References Cited

U.S. PATENT DOCUMENTS

| | | | | |
|---|---|---|---|---|
| 2009/0290545 A1* | 11/2009 | Chun | ............... | H04L 1/1607 |
| | | | | 370/329 |
| 2010/0290400 A1* | 11/2010 | Lee | ............... | H04L 1/1825 |
| | | | | 370/328 |
| 2016/0227471 A1* | 8/2016 | De Foy | ............... | H04W 4/001 |
| 2017/0078921 A1* | 3/2017 | Xia | ............... | H04W 28/08 |

OTHER PUBLICATIONS

Ford, A. et al., "TCP Extensions for Multipath Operation with Multiple Addresses", IETF, RFC 6824, Jan. 2013, 1-65.

Gonzalez, Miguel Angel P. et al., "Radio Access Considerations for Data Offloading with Multipath TCP in Cellular/WiFi Networks", IEEE International Conference on Information Networking (ICOIN), Jan. 28-30, 2013, 680-685.

Paasch, Christoph et al., "Exploring Mobile/WiFi Handover with Multipath TCP", Cellular Networks: Operations, Challenges, and Future Design, Helsinki, Finland, Aug. 13, 2012, 31-36.

\* cited by examiner

MULTI-PATH TRANSMISSION CONTROL PROTOCOL

TECHNICAL FIELD

This disclosure relates to multipath transmission control protocol (MPTCP). In more particular, it relates to handling of a MPTCP session by a controller of a second radio access type, RAT, by a MPTCP capable network proxy node, and by a MPTCP network system. This disclosure also relates to methods therein and computer programs therefore.

BACKGROUND

Most hosts today are multi-homed. Hence, they have multiple paths for connectivity via one or more access technologies. Regular transmission control protocol (TCP)/Internet protocol (IP) communications restrict these multi-homed hosts to use only one of the available interfaces/paths per session, where path is defined as an IP address pair of the source and destination of the path. Internet engineering task force (IETF) is looking into a mechanism, which uses multiple paths between communicating peers simultaneously during a communication session. Request for comments (RFC) 6824, January 2013 proposes a set of extensions to traditional TCP for multipath operations when multiple addresses are available. This protocol is referred to as MPTCP.

The advantages of using multiple paths concurrently comprise:
  Improve network resource utilization, e.g. increase bandwidth due to resource pooling
  Improve user experience through higher throughput
  Allows failover from one interface to another, e.g., mobile client
  Allows a single data connection to use several interfaces simultaneously FIG. 1 schematically presents a usage scenario for MPTCP, in which two communicating hosts A and B are multi-homed and multi-addressed. Each host provides two separate connections to the Internet offering four different paths between them, A1-B1, A1-B2, A2-B1 and A2-B2.

A traditional TCP connection between the hosts A and B will make use of only one of the available paths whereas MPTCP connection makes use of all the four available paths between hosts A and B. An MPTCP connection is similar to a regular TCP connection and is defined in RFC 6824 as: a set of one or more subflows, over which an application can communicate between two hosts. A subflow is defined in RFC 6824 as: A flow of TCP segments operating over an individual path, which forms part of a larger MPTCP connection. A subflow is started and terminated similar to a regular TCP connection.

MPTCP is an end-to-end protocol which requires both hosts to support MPTCP to benefit from MPTCP. Since, MPTCP is still in its early stage of deployment, probabilities that every host on the Internet supports MPTCP are very low. To overcome this problem and benefit from MPTCP even though both communicating hosts do not support MPTCP, an MPTCP proxy may be used to convert MPTCP flows to TCP and vice versa.

FIG. 2 schematically presents a scenario in which a UE is MPTCP capable whereas a server, corresponding to Host B, is MPTCP unaware.

The MPTCP-capable UE, corresponding to Host A, is controlled by the operator and sets up several MPTCP subflows to the MPTCP proxy placed in the operator's network. This proxy in turn sets up a single TCP flow to a server on the Internet, corresponding to Host B, which is not MPTCP capable. In the described scenario, the UE which supports MPTCP can still get the benefits of MPTCP although the server at the other end is not aware of MPTCP.

One principle of multipath TCP is to aggregate a set of TCP connections for example over different wireless interfaces such as $3^{rd}$ generation partnership program (3GPP) and wireless local area network accesses, such as Wi-Fi, or even different simultaneous 3GPP accesses. MPTCP has one main flow and multiple subflows and is capable of distributing load on all interfaces. As the multiplexing of different connections is on TCP level it allows separate congestion control for each subflow.

FIG. 3 shows the differences between standard TCP and MPTCP protocol stacks. The application interface, i.e., the socket application programming interface (API) is unchanged and the main changes are between this API and the IP-layer. MPTCP provides the possibility to fully and maximally utilize different TCP subflows. For example, in the case of one TCP subflow on 3GPP access and another one on a wireless local area network (WLAN) such as Wi-Fi access, the total throughput may be the sum of these subflows.

FIG. 4 shows a user plane protocol architecture example for the case when MPTCP would be utilizing LTE and WLAN/Wi-Fi simultaneously. The LTE subflow is visualized to the left in the figure, whereas the Wi-Fi subflow is visualized to the right in the figure. Additional protocol layers may also be included, for example an 802.11 logical link control (LLC) protocol between the protocol layers IP2 and 802.11 medium access control (MAC) (not shown in FIG. 4).

FIG. 5 shows an example of a MPTCP system in which a UE is simultaneously connected to both LTE and Wi-Fi/WLAN and where a MPTCP subflow is present for each radio access type. The application in the UE has opened up one TCP socket and is sending a "stream of bytes" on the internal API. The MPTCP layer may contain different functionality, one of which may be called MPTCP scheduler, has established two different TCP subflows, subflow 1 via WLAN/Wi-Fi, to the left in the UE, and subflow 2 via LTE, to the right in the UE. Both these subflows are in this example towards a MPTCP proxy node that further communicates with another server using plain TCP, on the right-hand side in the figure.

The MPTCP scheduler is the function that decides how the different packets are mapped to the two subflows. In this example, the MPTCP scheduler is applying "round-robin" scheduling, by alternating between subflow 1 and 2, i.e., first TCP segment is sent on subflow 2, second on subflow 1, third again on subflow 2 etc. Another example is that a MPTCP scheduler uses the subflow with the shortest round-trip time.

MPTCP brings two general advantages, one being that "seamless session continuity at mobility" is enabled, and the other advantage is that throughput aggregation is enabled.

The MPTCP "seamless session continuity at mobility" functionality may also be called "MPTCP session continuity". The basic principle for this functionality is the concepts of "main" and "backup" subflows. The "main" subflow is normally established first and used for data transmission while the "backup" subflow is established after (or in parallel) to the "main" subflow and not used for data transmission as long as the "main" subflow is operational. If the "main" subflow fails, then the "backup" subflow becomes the "main" subflow and all transmission is moved to the "backup" subflow, in its new status as the "main subflow". A similar approach applies for the release of the subflows when this functionality is used. This means that when the "main" subflow is released, the related "backup" subflow is also released.

When using MPTCP "seamless session continuity at mobility", two drawbacks have been identified.

During a MPTCP connection to setup, add or remove a subflow, or a connection to close, control signal exchange will occur on the subflow, even if the subflow is used as "backup path" for "seamless session continuity at mobility" and no data will be transmitted on the backup subflow unless there is problem with the main subflow due to e.g. changed conditions caused by mobility.

If a 3GPP access is used for a backup subflow, and although no data is transmitted, state changes occur on 3GPP side, e.g. for LTE state transitions between RRC_CON-NECTED and RRC_IDLE will occur. This may happen for example due to establishment and release of a backup subflow on 3GPP access. An additional example is if the backup subflow is maintained a long time as then even a possible keep-alive signaling on the backup subflow will have similar effect. This results in resource allocation and additional signaling on 3GPP access. This is a drawback since no data may be transmitted on the backup subflow.

In the case a UE is moving and the UE is leaving Wi-Fi for 3GPP access, and the UE is having a "main" subflow on Wi-Fi and possibly a "backup" subflow on 3GPP access, there will be a disconnection time as the MPTCP needs to detect an outage of the Wi-Fi subflow before traffic is moved to 3GPP subflow. The connection time may be even longer in a scenario when a 3GPP subflow has been setup a for a long time, and the UE in the 3GPP access has entered idle state due to inactivity on the 3GPP subflow (and inactivity related to other traffic as well), as in this case the UE needs to also enter "connected" state in the 3GPP access.

FIG. 6 schematically presents an exemplary MPTCP capable system comprising an MPTCP capable network proxy node 62, a controller of a first radio access type (RAT) 61, a controller of a second RAT, and a MPTCP capable user equipment (UE) 68, according to the prior art.

There is thus a need for a solution addressing one or more of these issues as discussed above.

SUMMARY

It is an object of exemplary embodiments to address at least some of the issues outlined above, and this object and others are achieved by a controller of a second RAT, a MPTCP capable network proxy node, and by a MPTCP capable network system according to the appended independent claims, and by embodiments of the disclosure according to the dependent claims.

According to an aspect it is disclosed a method in a controller of a second radio access type (RAT) for controlling multipath transmission control protocol (MPTCP) subflows and controlling UE radio access network state in a first RAT, when MPTCP session continuity is applied for a MPTCP capable UE, connected to a MPTCP capable network proxy node, and where the MPTCP capable UE is connected to a controller of a second RAT, with an active MPTCP subflow. The method comprises detecting that the UE performance has decreased beyond a first threshold. The method also comprises sending to a MPTCP capable network proxy node an indication that the UE performance has decreased beyond a first threshold, for enabling reduction of disconnection time for the UE.

According to another aspect it is disclosed a method in a MPTCP capable network proxy node for controlling MPTCP subflow establishment and release, and for controlling UE radio access network state in a first RAT, when MPTCP session continuity is applied for a MPTCP capable UE connected to the MPTCP capable network proxy node, wherein the UE is connected to a first RAT, and wherein the UE is connected to a second RAT with an active MPTCP subflow. The method comprises receiving an indication from a controller of the second RAT. The method also comprises triggering an MPTCP control action for reducing disconnection time for the UE, based on the received indication.

According to another aspect it is disclosed a method of a method in a MPTCP capable network system, for MPTCP subflow control, establishment and release, and for controlling UE radio access network state in a first RAT. MPTCP session continuity is applied for a MPTCP capable UE connected to a MPTCP capable network proxy node, wherein the UE is connected to a controller of a second RAT with an active MPTCP subflow. The method comprises detecting by a controller of a second RAT that the UE performance has decreased to beyond a first threshold. The method further comprises sending by the controller of the second RAT, to the MPTCP capable network proxy node, an indication, when the controller of the second RAT has detected that the UE performance has decreased beyond the first threshold, and the MPTCP capable network proxy node receiving the indication from the controller of the second RAT. In addition, the method also comprises triggering by the MPTCP capable network proxy node an MPTCP control action to reduce disconnection time for the UE, based on the indication as received by the MPTCP capable network proxy node.

According to another aspect it is disclosed a controller of a second RAT which is capable of controlling MPTCP subflows and controlling UE radio access network state in the first RAT, where MPTCP session continuity is applied for a UE connected to the MPTCP capable network proxy node, and where the UE is connectable to a controller of a second radio access type, RAT, with an active MPTCP subflow. The controller of the second RAT comprises a processor and a memory storing a computer program comprising computer program code which when run in the processor, causes the controller of the second RAT to detect that the UE performance has decreased beyond a first threshold. Also, when the computer program code is run in the processor, it also causes the controller of the second RAT to send to the MPTCP capable network proxy node an indication that the UE performance has decreased beyond the first threshold, for enabling reduction of disconnection time for the UE.

According to another aspect it is disclosed a computer program having computer readable program code which when run in a processor of a controller of the second RAT, capable of controlling MPTCP subflows and UE radio access network state in the first RAT, where MPTCP session continuity is applied for a MPTCP capable UE connected to a MPTCP capable network proxy node, and where the UE is connectable to a controller of a second RAT with an active MPTCP subflow, causes it to detect that the UE performance has decreased beyond a first threshold. When the computer readable program code is run in the processor it also causes the controller of the second RAT to send to the MPTCP capable network proxy node an indication that the UE performance has decreased beyond a first threshold, for enabling reduction of disconnection time for the UE.

According to another aspect it is disclosed a controller of a second RAT that is adapted to control MPTCP subflows and to control UE radio access network state in a first RAT, when MPTCP session continuity is applied for a MPTCP capable UE, connected to a MPTCP capable network proxy node, wherein the UE is connected to a controller of a second RAT, with an active MPTCP subflow. The controller comprises a detecting unit that is adapted to detect that the UE performance has decreased beyond a first threshold. The controller of the second RAT also comprises a transmitting unit that is adapted to send to the MPTCP capable network proxy node an indication that the UE performance has decreased beyond a first threshold, for enabling reduction of disconnection time for the UE.

According to another aspect it is disclosed a controller of a second RAT, capable of controlling MPTCP subflows and controlling UE radio access network state in a first RAT, where MPTCP session continuity is applied for a UE connected to a MPTCP capable network proxy node, and where the UE is connectable to a controller of a second RAT with an active MPTCP subflow, which MPTCP capable network proxy node further is adapted to detect that the UE performance has decreased beyond a first threshold, and to send to the MPTCP capable network proxy node an indication that the UE performance has decreased beyond a first threshold, for enabling reduction of disconnection time for the UE.

According to yet another aspect it is disclosed a MPTCP capable network proxy node that is capable to control MPTCP subflow establishment and release, and to control UE radio access network state in a first RAT, where MPTCP session continuity is applied for a MPTCP capable UE connected to the MPTCP capable network proxy node, and where the UE is connectable to a controller of a second RAT, with an active MPTCP subflow. The MPTCP capable network proxy node comprises a processor and a memory storing a computer program comprising computer program code which when run in the processor, causes the MPTCP capable network proxy node to receive an indication from a controller of a second RAT. Also, when the computer program code is run in the processor, it causes the MPTCP capable network proxy node to trigger an MPTCP control action for reducing disconnection time for the UE, based on the received indication.

According to yet another aspect it is disclosed a computer program having computer readable program code which when run in a processor of a MPTCP capable network proxy node, capable to control MPTCP subflow establishment and release, and to control UE radio access network state in a first RAT, where MPTCP session continuity is applied for a MPTCP capable UE connected to the MPTCP capable network proxy node, and where the UE is connectable to a controller of a second radio access type, RAT, with an active MPTCP subflow, causes it to receive an indication from a controller of a second RAT. Also, when the computer readable program code is run in the processor, it causes the MPTCP capable network proxy node to trigger an MPTCP control action to reduce disconnection time for the UE, based on the received indication.

According to yet another aspect it is disclosed a MPTCP capable network proxy node that is capable to control MPTCP subflow establishment and release, and to control UE radio access network state in a first RAT, where MPTCP session continuity is applied for a MPTCP capable UE, connected to the MPTCP capable network proxy node 140, and the UE being connectable to a controller of a second RAT, with an active MPTCP subflow. The MPTCP capable network proxy node comprises a receiving unit that is adapted to receive an indication from a controller of a second RAT. The MPTCP capable network proxy node also comprises a triggering unit that is adapted to trigger an MPTCP control action to reduce disconnection time for the UE, based on the received indication.

According to yet another aspect it is disclosed a MPTCP capable network proxy node that is capable to control MPTCP subflow establishment and release, and to control UE radio access network state in a first RAT, where MPTCP session continuity is applied for a MPTCP capable UE connected to a MPTCP capable network proxy node, and where the UE is connectable to a controller of a second RAT with an active MPTCP subflow, which MPTCP capable network proxy node further is adapted to receive an indication from a controller of a second RAT, and to trigger an MPTCP control action to reduce disconnection time for the UE, based on the received indication.

According to still yet another aspect it is disclosed a MPTCP capable network system that is capable to control MPTCP subflow establishment and release, and to control UE radio access network state in a first radio access type, RAT, where MPTCP session continuity is applied for a MPTCP capable UE connected to a MPTCP capable network proxy node, and where the UE is connectable to a controller of a second RAT, with an active MPTCP subflow. The MPTCP capable network system comprises a processor and a memory storing a computer program comprising computer program code which when run in the processor, causes the MPTCP capable network system to detect by a controller of a second RAT that the UE performance has decreased beyond a threshold. When the computer program code is run in the processor, it also causes the MPTCP capable network system to send by the controller of the second RAT, to the MPTCP capable network proxy node, an indication, when the controller of the second RAT has detected that the UE performance has decreased beyond the threshold, the MPTCP capable network proxy node to receive the indication from the controller of the second RAT. In addition, when the computer program code is run in the processor, it also causes the MPTCP capable network system to trigger by the MPTCP capable network proxy node an MPTCP control action to reduce disconnection time for the UE, based on the indication as received by the MPTCP capable network proxy node According to still yet another aspect it is disclosed a computer program having computer readable program code which when run in a processor of a MPTCP capable network system that is capable to control MPTCP subflow establishment and release, and to control UE radio access network state in a first radio access type, RAT, where MPTCP session continuity is applied for a MPTCP capable UE connected to the MPTCP capable network proxy node, and where the UE is connectable to a controller of a second RAT, with an active MPTCP subflow, causes it to detect by a controller of a second RAT that the UE performance has decreased to a threshold. When the computer readable program code is run in the processor, it further causes the MPTCP capable network system to send by the controller of the second RAT, to the MPTCP capable network proxy node, an indication, when the controller of the second RAT has detected that the UE performance has decreased to the threshold, the MPTCP capable network proxy node to receive the indication from the controller of the second RAT. In addition, when the computer readable program code is run in the processor, it also causes the MPTCP capable network system to trigger by the MPTCP capable network proxy node an MPTCP control action to reduce disconnection time for the UE, based on the indication as received by the MPTCP capable network proxy node.

According to still yet another aspect it is disclosed a MPTCP capable network system for the scenario when the UE is leaving the coverage area of the second RAT. The MPTCP capable network system is adapted to control MPTCP subflow establishment and release, and to control UE radio access network state in a first radio access type, RAT, and comprises a controller of a second RAT, and a MPTCP capable network proxy node.

According to still yet another aspect it is disclosed a MPTCP capable network system capable of controlling MPTCP subflow establishment and release, and to control UE radio access network state in a first radio access type, RAT, where MPTCP session continuity is applied for a MPTCP capable UE connected to a MPTCP capable network proxy node, and where the UE is connectable to a controller of a second RAT with an active MPTCP subflow, which MPTCP capable network system is further adapted to detect by a controller of a second RAT that the UE performance has decreased to a threshold. The MPTCP capable network system is also adapted to send by the controller of the second RAT, to the MPTCP capable network proxy node, an indication, when the controller of the second RAT has detected that the UE performance has decreased to the threshold, the MPTCP capable network proxy node to receive the indication from the controller of the second RAT. The MPTCP capable network system is also adapted to trigger by the MPTCP capable network proxy node an MPTCP control action to reduce disconnection time for the UE, based on the indication as received by the MPTCP capable network proxy node.

Embodiments of the present disclosure bring the advantage of reduction of disconnection time for the UE.

BRIEF DESCRIPTION OF THE DRAWINGS

Embodiments will now be described in more detail, and with reference to the accompanying drawings, in which.

DETAILED DESCRIPTION

In the following description, different embodiments of the exemplary embodiments will be described in more detail, with reference to accompanying drawings. For the purpose of explanation and not limitation, specific details are set forth, such as particular examples and techniques in order to provide a thorough understanding.

The present disclosure provides, when MPTCP is used for "seamless session continuity at mobility", reduced disconnection time for a UE. The present disclosure presents a MPTCP capable network proxy node, a controller of a second RAT, as well as a MPTCP capable network system.

Thus, this disclosure provides a way to eliminate the data disconnection time when the UE is leaving, for instance, a Wi-Fi access for 3GPP access due to e.g. mobility, when MPTCP is used for "seamless session continuity at mobility". In the following it is described a method and mechanism on coordination between MPTCP subflow setup/release and radio resource handling of first and second radio access types, such as 3GPP and Wi-Fi RAT, for achieving "seamless session continuity at mobility" with, close to, minimal data disconnection for the UE.

It has been observed that when a UE is leaving a second RAT coverage area, the UE may become disconnected. This is obviously a problem for which reason this disclosure intends to reduce the time during which the UE become disconnected, i.e. the disconnection time.

If the UE is using a MPTCP timeout mechanism for switching from a second RAT to a first RAT, for instance when switching from Wi-Fi subflow to LTE subflow, and if the UE in the first RAT access is in idle state when the UE is leaving the second RAT coverage, the data interruption, or disconnection, length could be considerable. In this case the data interruption time is equal to the length of the detection of the MPTCP timeout plus the time required to setup the UE in the first RAT access from idle state to connected state. The latter may also include paging of the UE in the first RAT if the first data transmission on the 3GPP subflow being activated is in the downlink direction (i.e. from the network towards the UE).

Thus, when a UE moves outside the coverage area of a second RAT, such as Wi-Fi, a timeout will occur, and the data will be switched to the first RAT. However, if the UE in the first RAT is in idle state, an additional amount of time is required until the first RAT has entered connected state and can receive the data to be transmitted from the second RAT. These time durations typically causes data interruption, i.e. causes a disconnection time.

However, when applying the inventive idea of the present disclosure, the following can be presented.

Figure 1:
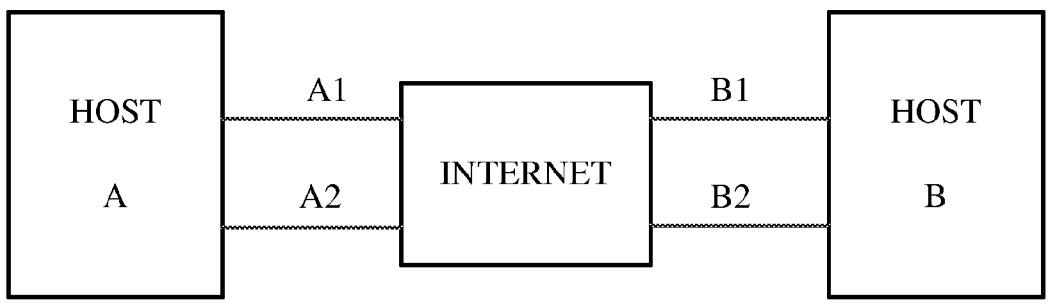
FIG. 1 schematically illustrates a MPTCP usage configuration, according to prior art.
Figure 2:
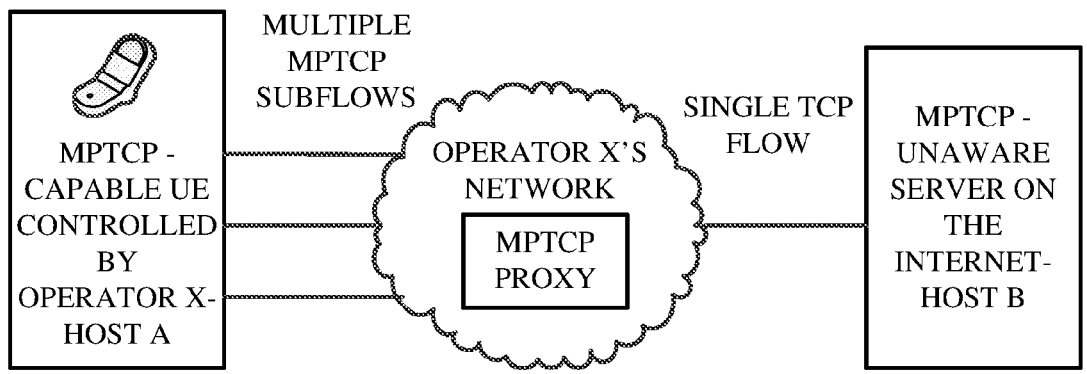
FIG. 2 present a use case for a MPTCP proxy, according to prior art.
Figure 3:
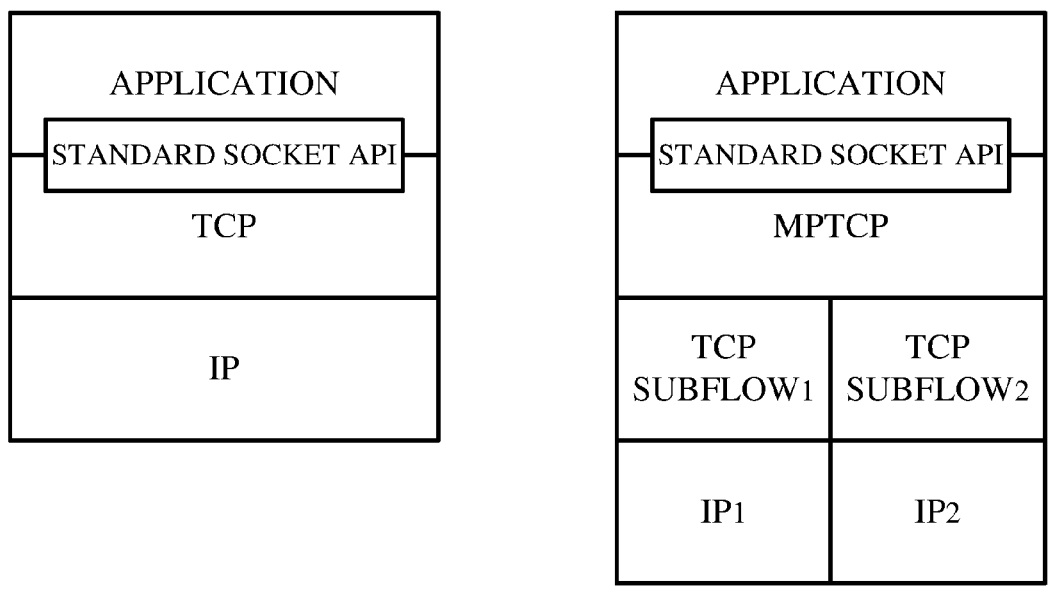
FIG. 3 presents standard TCP and MPTCP protocol stacks, according to prior art.
Figure 4:
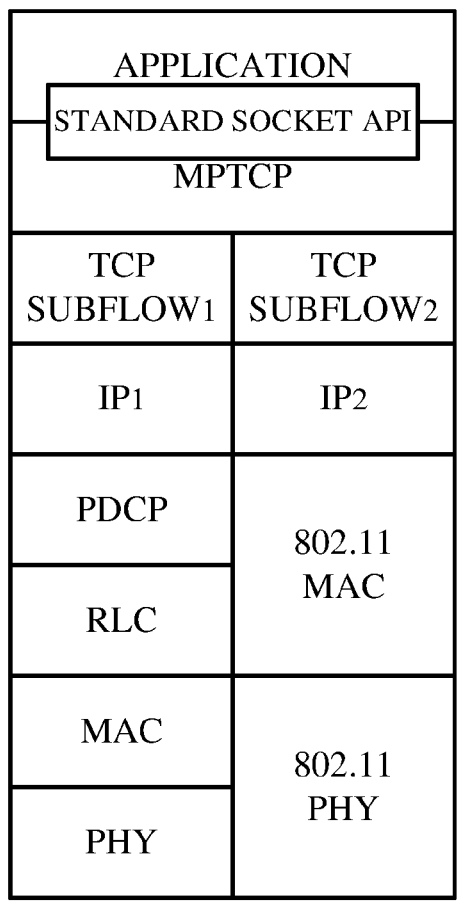
FIG. 4 presents multipath TCP in multi-IP scenarios, according to prior art.
Figure 6:
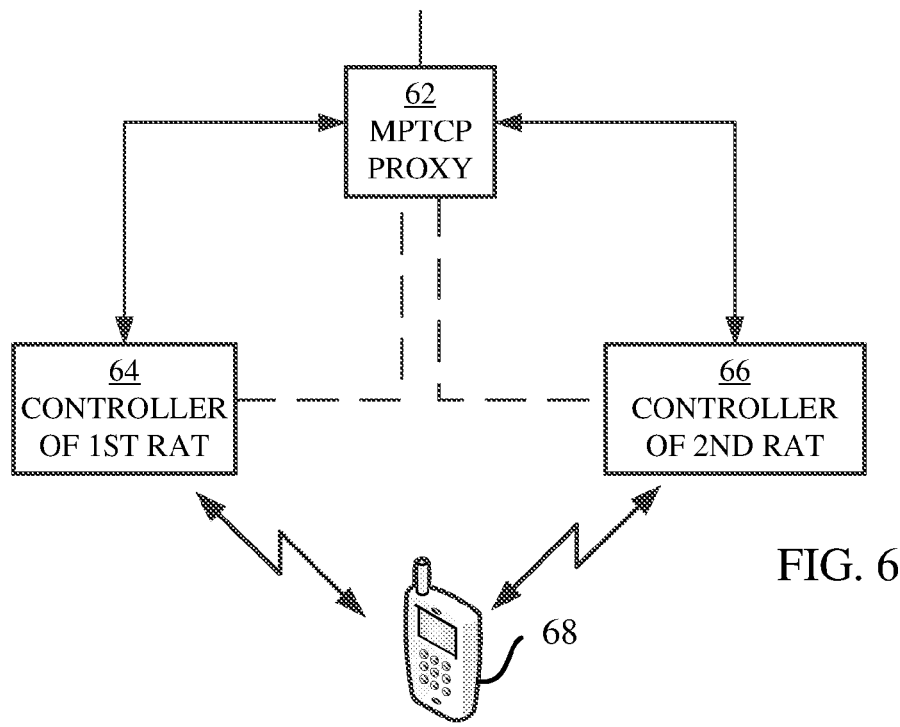
FIG. 6 presents an exemplary MPTCP capable system.
Figure 5:
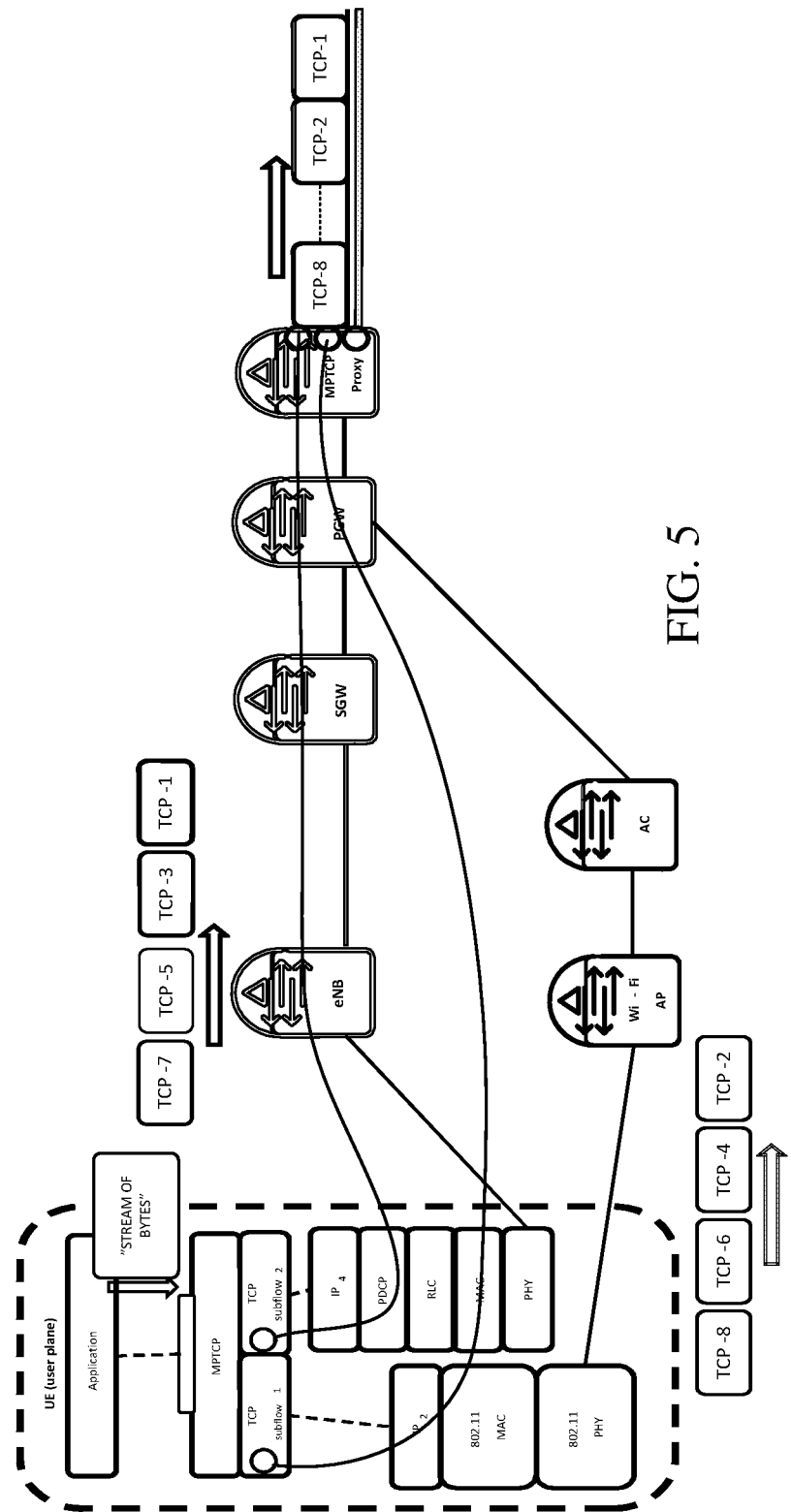
FIG. 5 illustrates MPTCP subflows in a MPTCP capable network system, according to prior art.
Figure 7A:
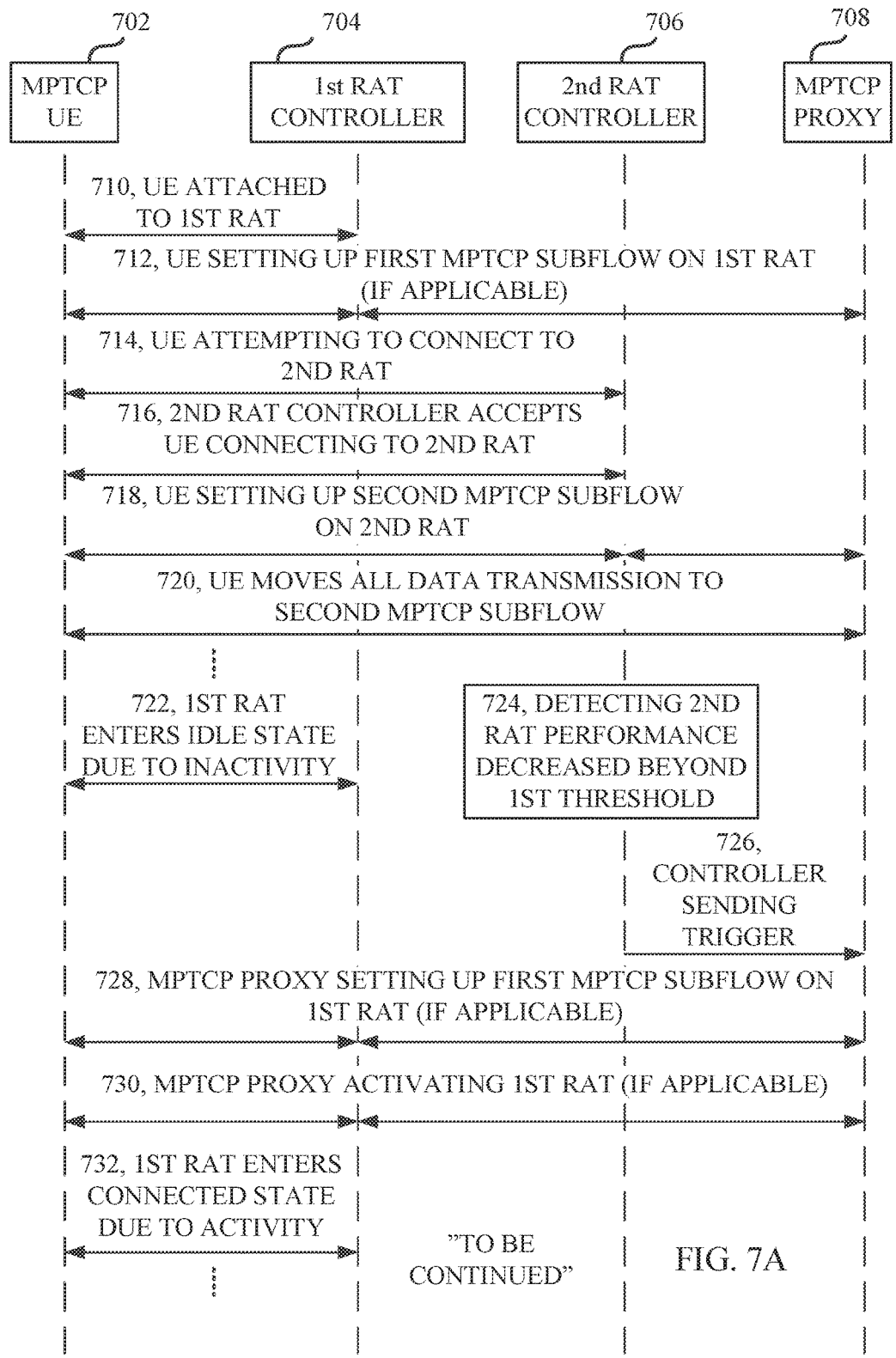
FIGS. 7A and 7B present signaling diagrams of embodiments of this disclosure.
Figure 7B:
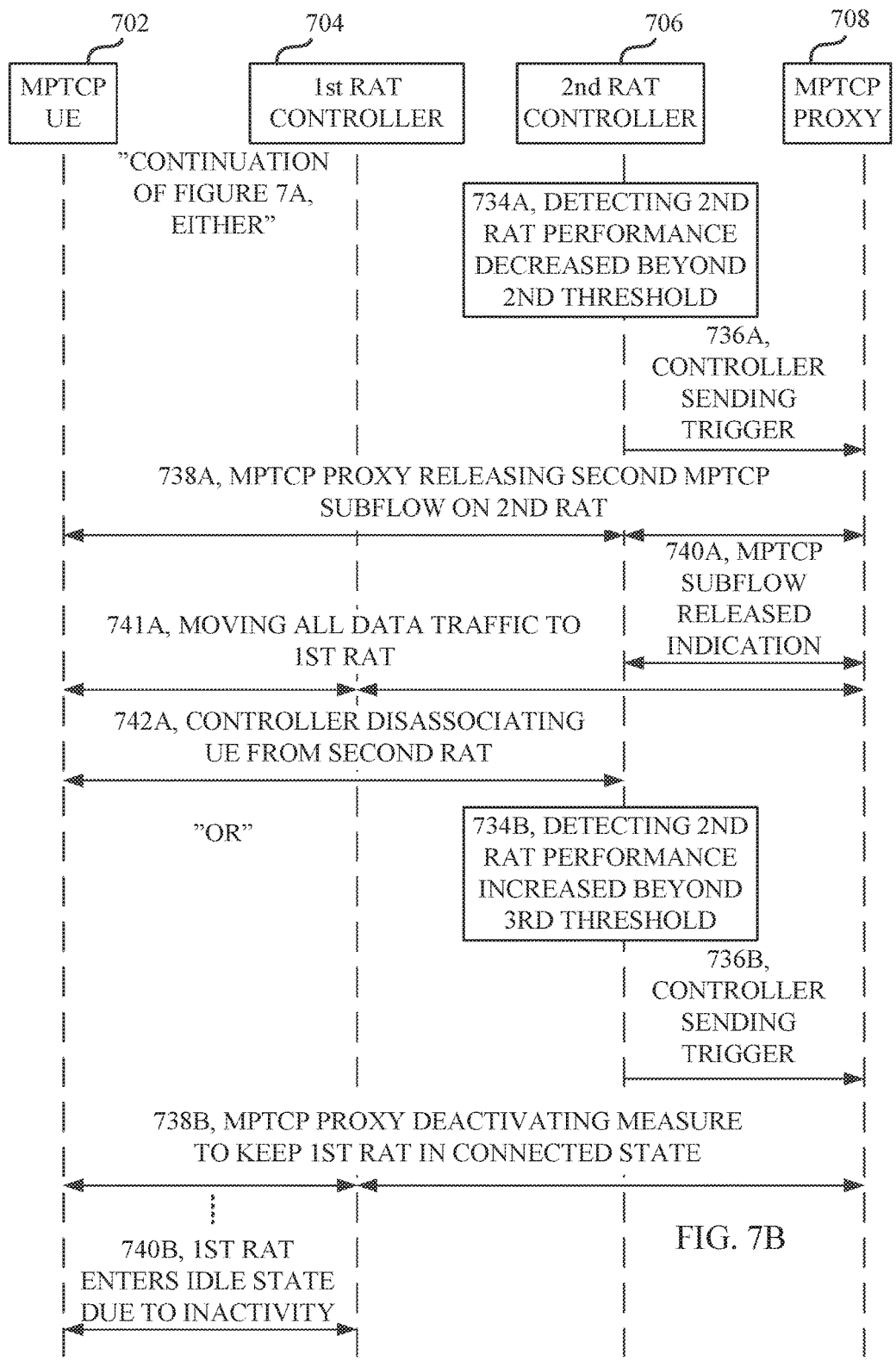

FIGS. 7A and 7B illustrate scenarios in a MPTCP system in the form of a schematic hand-shake diagram when a UE is leaving a second RAT, in order to reduce disconnection time for the UE It is pointed out that unnecessary details of the different steps are omitted for clarity.

Within the schematic signaling diagram signaling is communicated between a MPTCP UE 702, a controller of a first RAT 704, a controller of a second RAT 706, and a MPTCP capable network proxy node 708, which will be denoted MPTCP proxy down below.

It is noted that "MPTCP UE", denotes that the UE is MPTCP capable. In the following the "MPTCP UE" will be denoted "UE", only.

In 710, the UE 702 communicates via the controller of the first RAT 704, and is attached to the first RAT.

In 712, the UE sets up a first MPTCP subflow on the first RAT triggered by an application in the UE attempting to setup a TCP connection. The first MPTCP subflow becomes then the "main" subflow. This means, that unless there is already such a subflow setup for the UE, the UE sets up the MPTCP subflow.

In 714, the UE 702 communicates with the controller of the second RAT 706, and attempts to connect to the second RAT, which may be due the application of a "second RAT when coverage" policy.

In 716, the controller of the second RAT 704 accepts the attempt from the UE to connect to the second RAT.

In 718, the UE can hence set up a MPTCP subflow on the second RAT, via the controller of the second RAT 706. In this case, there is a preference to use the second RAT for data transmission in MPTCP seamless connectivity mode. Therefore, the MPTCP subflow in the second RAT becomes the "main" subflow and the first MPTCP subflow on the first RAT becomes the "backup" subflow. The latter, i.e. changing a MPTCP subflow from "main" subflow to "backup" subflow may also include MPTCP-level signaling on the first MPTCP subflow.

In 720, the UE moves all data transmission to the second MPTCP subflow.

If no data activity is present on the first RAT, the UE in the first RAT access enters idle state, in 722.

The described steps 710, 712, 714, 716, 718 and 720 are one possible example. Another example is a case in which the UE is initially attached or associated to both the first and the second RAT. When an application in the UE attempts to setup a TCP connection, the "main" subflow is directly established on the second RAT and the "backup" subflow is established over the first RAT. Still another example is case in which the UE only establishes the "main" subflow on the second RAT and contains a policy that enables to network side to control when the "backup" subflows are established.

When the UE approaches a cell edge of the second RAT, the controller of the second RAT 706 detects 724 that a second RAT performance for the UE has decreased beyond a first threshold.

It is noted that the performance discussed throughout this application refers to the performance for the UE, and therefore may cause UE-specific measures.

It can be noted that a UE performance threshold may be for example calculated by using radio level and/or traffic load level information on both first and second RAT. This is also applicable throughout this application.

In 726, the controller of the second RAT then sends 726 a trigger to the MPTCP proxy 708. This trigger triggers the MPTCP proxy to set up 728 MPTCP subflow on the first RAT, if applicable. This means that unless there already is a first RAT subflow established, a subflow on the first RAT is set up.

In 730, the MPTCP proxy may activate the first RAT, if the UE in the first RAT access is in idle state. This is to ascertain that the UE in the first RAT access is in connected state. This is especially needed in the case when the first RAT MPTCP subflow was not established in step 728. The activation may in all cases be periodic i.e. that the MPTCP proxy ensures that the UE is maintained in connected state.

In 732, as a result the UE in the first RAT access enters connected state due to activity.

FIG. 7A is continued by FIG. 7B.

When the UE continues to move towards the cell edge, the controller may detect 734A that the second RAT performance for the UE has decreased beyond a second threshold. The controller of the second RAT then sends a trigger in 736A to the MPTCP proxy 708, which triggers a release 738A of the MPTCP subflow on the second RAT. In 740A the MPTCP proxy sends an indication that the MPTCP subflow is released to the controller of the second RAT.

Then, all data traffic from the second RAT is moved 741A to the first RAT, being in connected state. In 742A the controller of the second RAT disassociates the UE from the second RAT.

The steps 738A, 740A, 741A and 742A can take place in any order, for example step 741A may be performed before the other of these steps.

Since data present on the second RAT is moved to the first RAT before the second RAT is released, the mobility will appear or become "seamless" to a user of the UE.

If, the controller of the second RAT, alternatively detects 734B that the second RAT performance for the UE has increased beyond a third threshold, being higher that the first threshold, the controller of the second RAT sends a trigger to the MPTCP proxy, in 736B. This trigger triggers the MPTCP proxy to deactivate a measure to maintain the UE in the first RAT access in connected state. This is because if the second RAT performance for the UE has reached such a high level, beyond third threshold, there is no risk for a performance for the UE issue on the second RAT.

The disconnection time, as mentioned above, has thus been considerably reduced.

Worded differently, when the UE starts approaching a second RAT cell edge, a first RAT subflow will be initiated 728, already at this stage before the UE reaches the second RAT cell edge and may cause performance degradation. The UE may also be activated to enter connected state in the first RAT. Both these steps are triggered by the controller of the second RAT detecting that the second RAT performance for the UE has decreased beyond a first threshold.

If the UE continues to move towards the second RAT cell edge and the controller of the second RAT detects 734A that the second RAT performance for the UE has decreased beyond a second threshold, being lower than the first threshold. The network therefore releases 738A the second RAT subflow on MPTCP level, resulting in that MPTCP traffic moves 741A to the first RAT subflow, after which the second RAT is disassociated 742A from the UE.

Since all traffic is moved to the first RAT subflow before the second RAT is released, the disconnection time for the UE is reduced. By keeping the UE in the first RAT access in connected state, before moving all data to a subflow on the first RAT, the disconnection time may be considered to be minimized, or at least largely reduced.

Thus, if the UE then moves outside second RAT coverage, no interruption occurs, since the dataflow is already moved to the first RAT.

In the following, methods and arrangements enabling reduction of disconnection time for the UE when the UE is leaving a second RAT coverage area, will be presented.

The first RAT may comprise a 3rd Generation partnership program (3GPP) RAT and the second RAT may comprise a wireless local area network (WLAN) RAT.

In the following, it will be presented methods in a controller of the second RAT, in a MPTCP capable network proxy node, and in a MPTCP capable network system, for controlling MPTCP subflows and UE radio access network state in the first RAT in a first RAT for a UE leaving the coverage area for the second RAT. In addition, it will be described the MPTCP entities, as well as computer programs for achieving the reduction of disconnection time.

Figure 8:
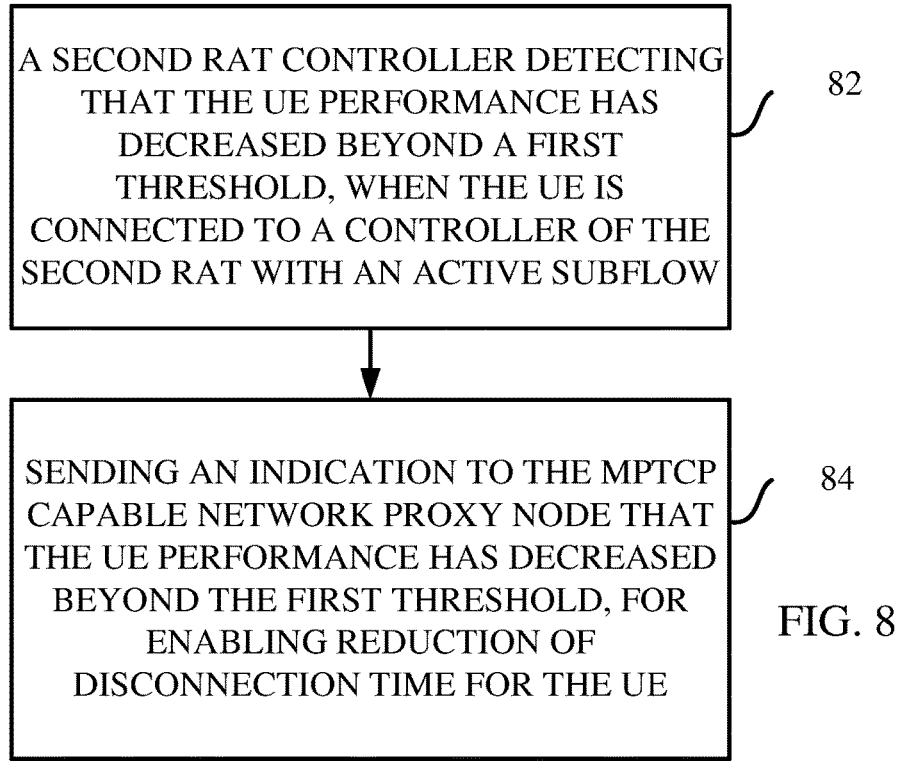
FIGS. 8 to 10 illustrate flowcharts of methods according to embodiments of this disclosure.

FIG. 8 presents a flowchart of a method in a controller of a second RAT for controlling MPTCP subflows and UE radio access network state in a first RAT, when MPTCP session continuity is applied for a MPTCP capable UE, connected to a MPTCP capable network proxy node. The UE is connected to a controller of a second RAT, with an active MPTCP subflow. The method comprises detecting 82, 724 that the UE performance has decreased beyond a first threshold. The method also comprises sending 84, 726 to a MPTCP capable network proxy node an indication that the UE performance has decreased beyond a first threshold, for enabling reduction of disconnection time for the UE.

The method may further comprise detecting 734A that the performance for the UE has decreased beyond a second threshold, being lower than the first threshold; and sending 736A to the MPTCP capable network proxy node 708 a trigger that the performance for the UE has decreased beyond the second threshold.

The method may further comprises receiving 740A from the MPTCP network proxy node 708 an indication that the MPTCP subflow on the second RAT is released, and triggering disassociating 742A the UE from the second RAT.

The method may also comprise detecting 734B that the performance for the UE has increased beyond a third threshold, being higher than the first threshold; and sending 736B to the MPTCP capable network proxy node 708 a trigger that the performance for the UE has increased beyond the third threshold.

Figure 9:
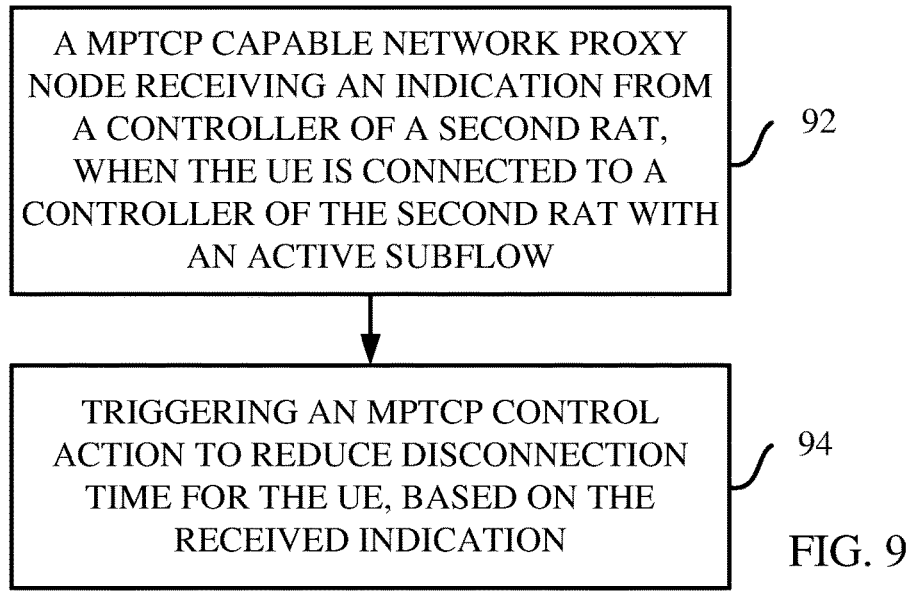

FIG. 9 presents a flowchart of a method in a MPTCP capable network proxy node 708 for controlling MPTCP subflow establishment and release, and for controlling UE radio access network state in a first RAT, when MPTCP session continuity is applied for a MPTCP capable user equipment, UE, 702 connected to the MPTCP capable network proxy node, wherein the UE being connected to a first RAT, and wherein the UE is connected to a second RAT with an active MPTCP subflow. The method comprises receiving 92, 726 an indication from a controller of the second RAT. The method also comprises triggering 94, 728, 738A; 738B an MPTCP control action for reducing disconnection time for the UE, based on the received indication.

Receiving the indication may comprise receiving 92, 726 an indication that the UE performance has decreased beyond a first threshold, and triggering the MPTCP control action may comprise adding 728 a MPTCP subflow for the UE in the first RAT, if the MPTCP subflow is not already established.

Triggering the MPTCP control action may comprise activating 730 the UE in the first RAT, to keep the UE in connected state in the first.

Activating 728 the UE in the first RAT may comprise periodically sending 730 to the UE a first RAT activating message. This message may be sent from the MPTCP proxy to the UE as user plane communication, and it may be sent as a control plane signaling towards a node in the first RAT.

Receiving the indication may further comprise receiving 736A an indication that the UE performance has further decreased beyond a second threshold being lower than the first threshold, and triggering the MPTCP control action may further comprise releasing 738A the active MPTCP subflow in the second RAT, and moving 741A all traffic to the first RAT.

The method may further comprise sending 740A an indication to the second RAT controller of released MPTCP subflow, triggering the second RAT controller to remove the access on the second RAT.

Receiving the indication may further comprise receiving 736B an indication that the UE performance has increased beyond a third threshold being higher than the first threshold, and wherein triggering the MPTCP control action may further comprise deactivating 738B the activation of the UE in the first RAT, enabling the UE in the first RAT to enter 740B idle state, and optionally releasing the active MPTCP subflow in the first RAT.

Figure 10:
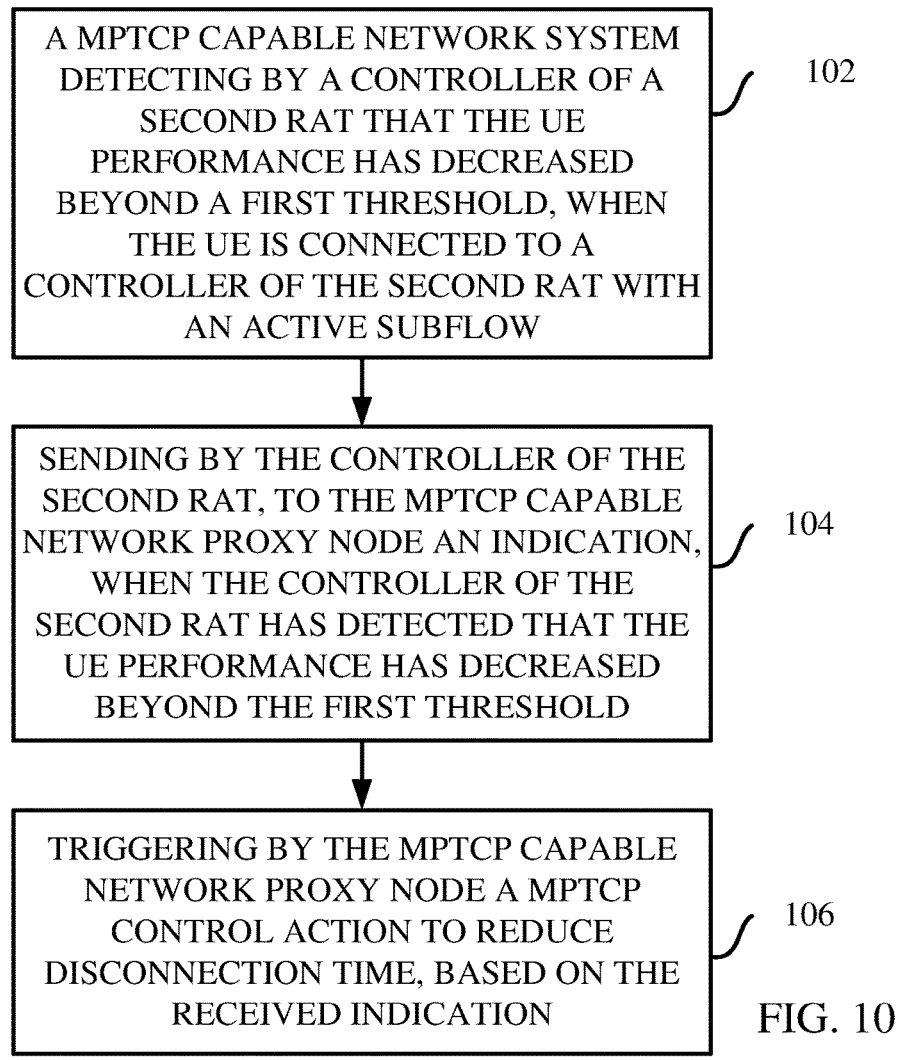

FIG. 10 presents a flow chart of a method in a MPTCP capable network system, for MPTCP subflow control, establishment and release, and for controlling UE radio access network state in a first RAT. As above, MPTCP session continuity is applied for a MPTCP capable UE connected to a MPTCP capable network proxy node, wherein the UE is connected to a controller of a second RAT with an active MPTCP subflow.

The method comprises detecting 102 by a controller of a second RAT that the UE performance has decreased to beyond a first threshold. The method further comprises sending 104 by the controller of the second RAT, to the MPTCP capable network proxy node, an indication, when the controller of the second RAT has detected that the UE performance has decreased beyond the first threshold, and the MPTCP capable network proxy node receiving the indication from the controller of the second RAT. In addition, the method also comprises triggering 106 by the MPTCP capable network proxy node an MPTCP control action to reduce disconnection time for the UE, based on the indication as received by the MPTCP capable network proxy node.

Having described methods when the UE is leaving the coverage area of the second RAT, it will now be described the controller of the second RAT, the MPTCP capable network proxy node, herein called MPTCP proxy, and the MPTCP capable network system.

When the UE is leaving the coverage area refers to the case in which the UE is about leave an area having good coverage for both first and second RAT into an area having coverage for only the first RAT, again where the second RAT has priority over the first RAT, as indicated above.

Also the respective arrangements relevant for the UE leaving a coverage area of the second RAT, will also be presented comprising functional units.

Figure 11:
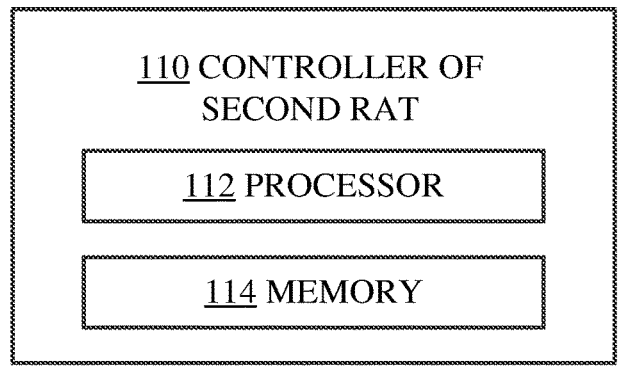
FIGS. 11 to 16 schematically illustrate arrangements according to embodiments of this disclosure.

FIG. 11 presents a schematic illustration of a controller of the second RAT 110 capable of controlling MPTCP subflows and controlling UE radio access network state in the first RAT, where MPTCP session continuity is applied for a UE connected to the MPTCP capable network proxy node, and where the UE is connectable to a controller of a second radio access type, RAT, with an active MPTCP subflow. The controller of the second RAT 110 comprises a processor 112 and a memory 114 storing a computer program comprising computer program code which when run in the processor 112, causes the controller of the second RAT 110 to detect that the UE performance has decreased beyond a first threshold. Also, when the computer program code is run in the processor, it also causes the controller of the second RAT 110 to send to the MPTCP capable network proxy node an indication that the UE performance has decreased beyond the first threshold, for enabling reduction of disconnection time for the UE.

When the computer program code is run in the processor of the controller of the second RAT 110, it may also cause the controller of a second RAT 110 to detect 734A that the performance for the UE has decreased beyond a second threshold, being lower than the first threshold; and to send 736A to the MPTCP capable network proxy node 708 a trigger that the performance for the UE has decreased beyond the second threshold When the computer program code is run in the processor, it may also cause the controller of a second RAT 110 to receive 740A from the MPTCP network proxy node 708 an indication that the MPTCP subflow on the second RAT is released, triggering disassociating 742A the UE from the second RAT.

When the computer program code is run in the processor, it may also cause the controller of a second RAT to detect 734B that the performance for the UE has increased beyond a third threshold, being higher than the first threshold; and to send 736B to the MPTCP capable network proxy node 708 a trigger that the performance for the UE has increased beyond the third threshold.

This disclosure also presents a computer program having computer readable program code which when run in a processor of a controller of the second RAT, capable of establishing and/or releasing a second RAT connection, where MPTCP session continuity is applied for a MPTCP capable UE connected to a MPTCP capable network proxy node, and where the UE is connectable to a controller of a second RAT with an active MPTCP subflow, causes it to detect 82 that the UE performance has decreased beyond a first threshold. When the computer readable program code is run in the processor it also causes the controller of the second RAT to send 84 to the MPTCP capable network proxy node an indication that the UE performance has decreased beyond a first threshold, for enabling reduction of disconnection time for the UE.

This disclosure also presents a carrier containing the computer program as above, wherein the carrier is one of an electronic signal, optical signal, radio signal or computer readable storage medium.

Figure 12:
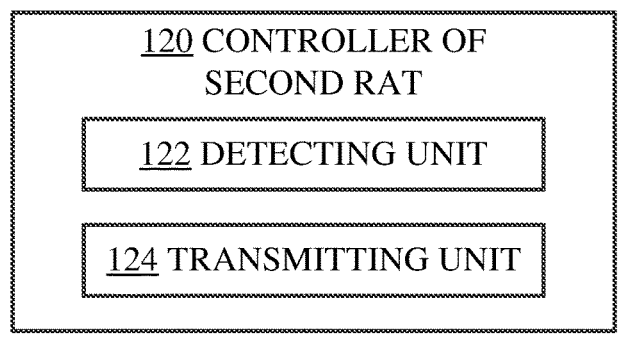

FIG. 12 presents schematically a controller 120 of a second RAT, adapted to control MPTCP subflows and to control UE radio access network state in the first RAT, when MPTCP session continuity is applied for a MPTCP capable UE, connected to a MPTCP capable network proxy node, wherein the UE is connected to a controller of a second RAT, with an active MPTCP subflow. The controller comprises a detecting unit 122 that is adapted to detect 82 that the UE performance has decreased beyond a first threshold. The controller of the second RAT also comprises a transmitting unit 124 that is adapted to send 84 to the MPTCP capable network proxy node an indication that the UE performance has decreased beyond a first threshold, for enabling reduction of disconnection time for the UE.

This disclosure also presents a controller of the second RAT, capable of controlling MPTCP subflows and controlling UE radio access network state in the first RAT, where MPTCP session continuity is applied for a UE connected to a MPTCP capable network proxy node, and where the UE is connectable to a controller of a second RAT with an active MPTCP subflow, which MPTCP capable network proxy node further is adapted to detect that the UE performance has decreased beyond a first threshold, and to send to the MPTCP capable network proxy node an indication that the UE performance has decreased beyond a first threshold, for enabling reduction of disconnection time for the UE.

Figure 13:
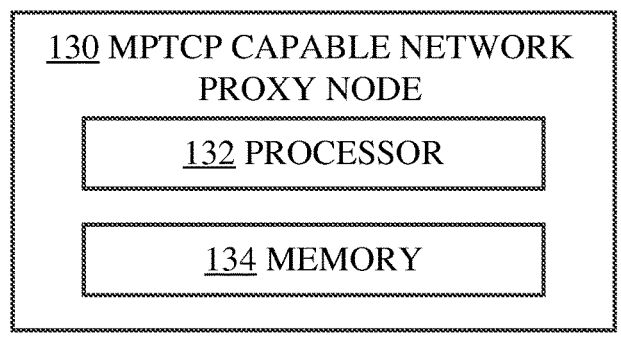

FIG. 13 presents a schematic illustration of a MPTCP capable network proxy node 130 that is capable to control MPTCP subflow establishment and release, to control UE radio access network state in the first RAT, where MPTCP session continuity is applied for a MPTCP capable UE connected to the MPTCP capable network proxy node, and where the UE is connectable to a controller of a second RAT, with an active MPTCP subflow. The MPTCP capable network proxy node comprises a processor 132 and a memory 134 storing a computer program comprising computer program code which when run in the processor 132, causes the MPTCP capable network proxy node to receive 92, 726 an indication from a controller of a second RAT. Also, when the computer program code is run in the processor, it causes the MPTCP capable network proxy node to trigger 94, 728, 738A; 738B an MPTCP control action for reducing disconnection time for the UE, based on the received indication.

When the computer program code is run in the processor, it may also cause the MPTCP capable network proxy node to receive 726 an indication that the UE performance has decreased beyond a first threshold, and to add 728 a MPTCP subflow for the UE in the first RAT, if the MPTCP subflow is not already established.

When the computer program code is run in the processor, it may also cause the MPTCP capable network proxy node to activate 730 the UE in the first RAT, to keep the UE in connected state in the first RAT.

When the computer program code is run in the processor, it may also cause the MPTCP capable network proxy node to periodically send 730 to the UE a first RAT activating message.

When the computer program code is run in the processor, it may also cause the MPTCP capable network proxy node to receive 736A an indication that the UE performance has further decreased beyond a second threshold being lower than the first threshold; to release 738A the active MPTCP subflow in the second RAT; and to move 741A all traffic to the first RAT.

When the computer program code is run in the processor, it may also cause the MPTCP capable network proxy node to send 740A an indication to the controller of released MPTCP subflow, triggering the controller to remove the access on the second RAT.

When the computer program code is run in the processor, it may also cause the MPTCP capable network proxy node to receive 736B an indication that the UE performance has increased beyond a third threshold being higher than the first threshold; and to deactivate 738B the activation of the UE, enabling the UE in the first RAT access to enter 740B idle state, and optionally to release the active MPTCP subflow in the first RAT.

This disclosure also presents a computer program having computer readable program code which when run in a processor of a MPTCP capable network proxy node, capable to control MPTCP subflow establishment and release, where MPTCP session continuity is applied for a MPTCP capable UE connected to the MPTCP capable network proxy node, and where the UE is connectable to a controller of a second radio access type, RAT, with an active MPTCP subflow, causes it to receive 92 an indication from a controller of a second RAT. Also, when the computer readable program code is run in the processor, it causes the MPTCP capable network proxy node to trigger 94 an MPTCP control action to reduce disconnection time for the UE, based on the received indication.

This disclosure also presents a carrier containing the computer program as above, wherein the carrier is one of an electronic signal, optical signal, radio signal or computer readable storage medium.

Figure 14:
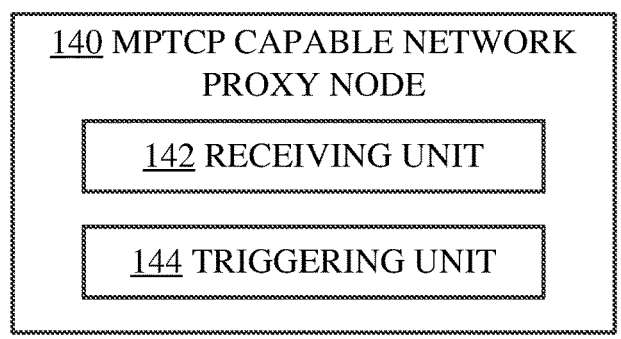

FIG. 14 may also be considered to present a MPTCP capable network proxy node 140 that is capable to control MPTCP subflow establishment and release, and to control UE radio access network state in the first RAT, where MPTCP session continuity is applied for a MPTCP capable UE, connected to the MPTCP capable network proxy node 140, and the UE being connectable to a controller of a second RAT, with an active MPTCP subflow. The MPTCP capable network proxy node 140 comprises a receiving unit 142 that is adapted to receive 92 an indication from a controller of a second RAT. The MPTCP capable network proxy node 140 also comprises a triggering unit 144 that is adapted to trigger 94 an MPTCP control action to reduce disconnection time for the UE, based on the received indication.

This disclosure also presents a MPTCP capable network proxy node 140 that is capable to control MPTCP subflow establishment and release, and to control UE radio access network state in the first RAT, where MPTCP session continuity is applied for a MPTCP capable UE connected to a MPTCP capable network proxy node 140, and where the UE is connectable to a controller of a second RAT with an active MPTCP subflow, which MPTCP capable network proxy node 140 further is adapted to receive 92 an indication from a controller of a second RAT, and to trigger 94 an MPTCP control action to reduce disconnection time for the UE, based on the received indication.

Figure 15:
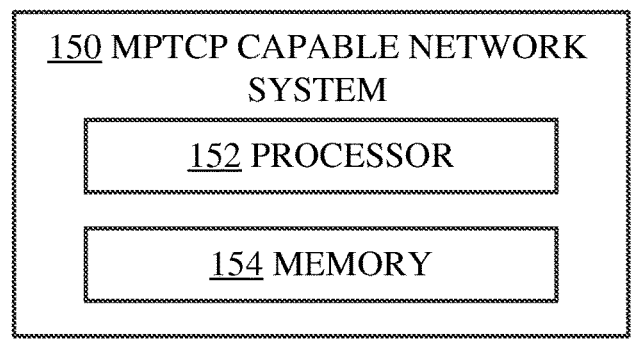

FIG. 15 presents a schematic illustration of a MPTCP capable network system 150 that is capable to control MPTCP subflow establishment and release, and to control UE radio access network state in the first RAT, where MPTCP session continuity is applied for a MPTCP capable UE connected to a MPTCP capable network proxy node, and where the UE is connectable to a controller of a second RAT, with an active MPTCP subflow. The MPTCP capable network system 150 comprises a processor 152 and a memory 154 storing a computer program comprising computer program code which when run in the processor 152, causes the MPTCP capable network system 150 to detect 102, 724 by a controller of a second RAT that the UE performance has decreased beyond a threshold. When the computer program code is run in the processor 152, it also causes the MPTCP capable network system 150 to send 104, 726 by the controller of the second RAT, to the MPTCP capable network proxy node, an indication, when the controller of the second RAT has detected that the UE performance has decreased beyond the threshold, the MPTCP capable network proxy node to receive the indication from the controller of the second RAT. In addition, when the computer program code is run in the processor 152, it also causes the MPTCP capable network system 150 to trigger 106, 728, 738A; 738B by the MPTCP capable network proxy node an MPTCP control action to reduce disconnection time for the UE, based on the indication as received by the MPTCP capable network proxy node.

This disclosure also presents a computer program having computer readable program code which when run in a processor of a MPTCP capable network system that is capable to control MPTCP subflow establishment and release, where MPTCP session continuity is applied for a MPTCP capable UE connected to the MPTCP capable network proxy node, and where the UE is connectable to a controller of a first RAT, with an active MPTCP subflow, causes it to detect 102, 724 by a controller of a second RAT that the UE performance has decreased to a threshold. When the computer readable program code is run in the processor 152, it further causes the MPTCP capable network system to send 104, 726 by the controller of the second RAT, to the MPTCP capable network proxy node, an indication, when the controller of the second RAT has detected that the UE performance has decreased to the threshold, the MPTCP capable network proxy node to receive the indication from the controller of the second RAT. In addition, when the computer readable program code is run in the processor, it also causes the MPTCP capable network system to trigger 106, 728, 738A; 738B by the MPTCP capable network proxy node an MPTCP control action to reduce disconnection time for the UE, based on the indication as received by the MPTCP capable network proxy node.

This disclosure also presents a carrier containing the computer program as above, wherein the carrier is one of an electronic signal, optical signal, radio signal or computer readable storage medium.

Figure 16:
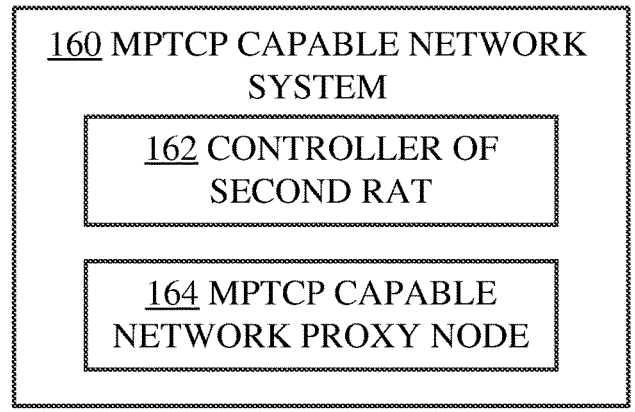

FIG. 16 may also be considered to present a MPTCP capable network system 160 for the scenario when the UE is leaving the coverage area of the second RAT. The MPTCP capable network system 160 is adapted to control MPTCP subflow establishment and release, and comprises a controller of a second RAT 162, and a MPTCP capable network proxy node 164.

This disclosure also presents a MPTCP capable network system 160 capable of controlling MPTCP subflows and controlling UE radio access network state in a first radio access type, RAT, where MPTCP session continuity is applied for a MPTCP capable UE connected to a MPTCP capable network proxy node, and where the UE is connectable to a controller of a first RAT with an active MPTCP subflow, which MPTCP capable network system 160 is further adapted to detect 102, 724 by a controller of a second RAT that the UE performance has decreased to a threshold. The MPTCP capable network system 160 is also adapted to send 104, 726 by the controller of the second RAT, to the MPTCP capable network proxy node, an indication, when the controller of the second RAT has detected that the UE performance has decreased to the threshold, the MPTCP capable network proxy node to receive the indication from the controller of the second RAT. The MPTCP capable network system 160 is also adapted to trigger 106, 728, 738A; 738B by the MPTCP capable network proxy node an MPTCP control action to reduce disconnection time for the UE, based on the indication as received by the MPTCP capable network proxy node.

Embodiments of the present disclosure bring the advantage of reduction of disconnection time for the UE.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

3GPP $3^{rd}$ generation partnership program
IP Internet protocol
LLC logical link control
LTE long term evolution
MAC medium access control
MPTCP multipath TCP
PDCP packet data control protocol
RAT radio access type
RFC request for comments
RLC radio link control
TCP transmission control protocol
UE user equipment
WLAN wireless local area network

The invention claimed is:

1. A method in a multipath transmission control protocol (MPTCP) capable network proxy node for controlling MPTCP subflow establishment and/or release, and for controlling UE radio access network state in the first radio access type (RAT) when MPTCP session continuity is applied for a MPTCP capable user equipment (UE) connected to the MPTCP capable network proxy node, wherein the UE is connected to the first RAT, and wherein the UE is connected to a second RAT with an active MPTCP subflow, the method comprising:

receiving an indication from a controller of the second RAT, wherein receiving the indication comprises receiving an indication that the UE performance has decreased beyond a first threshold; and triggering an MPTCP control action for reducing disconnection time for the UE, based on the received indication, wherein triggering the MPTCP control action comprises adding an MPTCP subflow for the UE in the first RAT, if the MPTCP subflow is not already established.

2. The method of claim 1, wherein triggering the MPTCP control action comprises activating the UE in the first RAT, to keep the UE in connected state in the first.

3. The method of claim 2, wherein activating the UE in the first RAT comprises periodically sending to the UE a first RAT activating message.

4. The method of claim 1, wherein receiving the indication further comprises receiving an indication that the UE performance has further decreased beyond a second threshold being lower than the first threshold, and wherein triggering the MPTCP control action further comprises releasing the active MPTCP subflow in the second RAT, and moving all traffic to the first RAT.

5. The method of claim 4, further comprising sending an indication to the controller of released MPTCP subflow, triggering the controller to remove the access on the second RAT.

6. The method of claim 1, wherein receiving the indication further comprises receiving an indication that the UE performance has increased beyond a third threshold being higher than the first threshold, and wherein triggering the MPTCP control action further comprises deactivating the activation of the UE, enabling the UE in the first RAT to enter idle state, and optionally releasing the active MPTCP subflow in the first RAT.

7. A non-transitory computer-readable medium comprising, stored thereupon, a computer program comprising instructions that, when executed on a processor of a multipath transmission control protocol (MPTCP) capable network proxy node, cause the processor to carry out the method of claim 1.

8. A method in a controller of a second radio access type (RAT) for controlling MPTCP subflows and UE radio access network state in a first RAT, when multipath transmission control protocol (MPTCP) session continuity is applied for a MPTCP capable user equipment (UE) connected to a MPTCP capable network proxy node, wherein the UE being connected to the first RAT, where the UE is connected to a second RAT with an active MPTCP subflow, the method comprising:

detecting that the performance for the UE has decreased beyond a first threshold;

sending to the MPTCP capable network proxy node an indication that the performance for the UE has decreased beyond the first threshold, for enabling reduction of disconnection time for the UE;

detecting that the performance for the UE has increased beyond a third threshold, being higher than the first threshold; and sending to the MPTCP capable network proxy node a trigger that the performance for the UE has increased beyond the third threshold.

9. The method of claim 8, further comprises detecting that the performance for the UE has decreased beyond a second threshold, being lower than the first threshold; and sending to the MPTCP capable network proxy node a trigger that the performance for the UE has decreased beyond the second threshold.

10. The method of claim 9, further comprising receiving from the MPTCP network proxy node an indication that the MPTCP subflow on the second RAT is released, triggering disassociating the UE from the second RAT.

11. A non-transitory computer-readable medium comprising, stored thereupon, a computer program comprising instructions that, when executed on a processor of a controller of a second RAT, cause the processor to carry out the method of claim 8.

12. A multipath transmission control protocol (MPTCP) capable network proxy node capable to control MPTCP subflow establishment and release, and to control UE radio access network state in a first radio access type (RAT) when MPTCP session continuity is applied for a MPTCP capable user equipment (UE) connected to the MPTCP capable network proxy node, wherein the UE is connected to the first RAT, and wherein the UE is connected to a second RAT with an active MPTCP subflow, the MPTCP capable network proxy node comprising:

a processor; and a memory storing a computer program comprising computer program code which when run in the processor, causes the MPTCP capable network proxy node to;

receive an indication from a controller of the second RAT, that the UE performance has decreased beyond a first threshold; and trigger an MPTCP control action for reducing disconnection time for the UE, based on the received indication, said MPTCP control action comprising the adding of a MPTCP subflow for the UE in the first RAT if the MPTCP subflow is not already established.

13. The MPTCP capable network proxy node of claim 12, wherein when the computer program code is run in the processor, it also causes the MPTCP capable network proxy node to activate the UE in the first RAT, to keep the UE in connected state in the first RAT.

14. The MPTCP capable network proxy node of claim 13, wherein when the computer program code is run in the processor, it also causes the MPTCP capable network proxy node to periodically send to the UE a first RAT activating message.

15. The MPTCP capable network proxy node of claim 12, wherein when the computer program code is run in the processor, it also causes the MPTCP capable network proxy node to receive an indication that the UE performance has further decreased beyond a second threshold being lower than the first threshold; to release the active MPTCP subflow in the second RAT; and to move all traffic to the first RAT.

16. The MPTCP capable network proxy node of claim 15, wherein when the computer program code is run in the processor, it also causes the MPTCP capable network proxy node to send an indication to the controller of released MPTCP subflow, triggering the controller to remove the access on the second RAT.

17. The MPTCP capable network proxy node of claim 12, wherein when the computer program code is run in the processor, it also causes the MPTCP capable network proxy node to receive an indication that the UE performance has increased beyond a third threshold being higher than the first threshold; and to deactivate the activation of the UE, enabling the first RAT to enter idle state, and optionally to release the active MPTCP subflow in the first RAT.

18. A controller of a second radio access type (RAT) capable to control MPTCP subflows and to control UE radio access network state in a first RAT, when multipath transmission control protocol (MPTCP) session continuity is applied for a MPTCP capable user equipment (UE) connected to a MPTCP capable network proxy node, wherein the UE being connected to the first RAT, where the UE is connected to a second RAT with an active MPTCP subflow, the controller of a second RAT comprising:

a processor; and a memory storing a computer program comprising computer program code which when run in the processor, causes the controller of a second RAT to:

detect that the performance for the UE has decreased beyond a first threshold;

send to the MPTCP capable network proxy node an indication that the performance for the UE has decreased beyond the first threshold, for enabling reduction of disconnection time for the UE;

detect that the performance for the UE has increased beyond a third threshold, being higher than the first threshold; and send to the MPTCP capable network proxy node a trigger that the performance for the UE has increased beyond the third threshold.

19. The controller of a second RAT of claim 18, wherein when the computer program code is run in the processor, it also causes the controller of a second RAT to detect that the performance for the UE has decreased beyond a second threshold, being lower than the first threshold; and to send to the MPTCP capable network proxy node a trigger that the performance for the UE has decreased beyond the second threshold.

20. The controller of a second RAT of claim 19, wherein when the computer program code is run in the processor, it also causes the controller of a second RAT to receive from the MPTCP network proxy node an indication that the MPTCP subflow on the second RAT is released, triggering disassociating the UE from the second RAT.

* * * * *